(12) United States Patent
Yokoi et al.

(10) Patent No.: US 7,089,793 B2
(45) Date of Patent: Aug. 15, 2006

(54) METHOD AND SYSTEM OF EXCITING A DRIVING VIBRATION IN A VIBRATOR

(75) Inventors: Shoji Yokoi, Nagoya (JP); Yoshihiro Kobayashi, Komagane (JP)

(73) Assignees: NGK Insulators, Ltd., Nagoya (JP); Seiko Epson Corporation, Shinjuku-Ku (JP)

( * ) Notice: Subject to any disclaimer, the term of this patent is extended or adjusted under 35 U.S.C. 154(b) by 168 days.

(21) Appl. No.: 10/803,176

(22) Filed: Mar. 17, 2004

(65) Prior Publication Data

US 2004/0182184 A1 Sep. 23, 2004

(30) Foreign Application Priority Data

Mar. 20, 2003 (JP) .......................... P2003-077155

(51) Int. Cl.
*G01P 15/10* (2006.01)
(52) U.S. Cl. ................................ 73/514.29
(58) Field of Classification Search ........... 73/1.38, 73/514.29, 32 A, 64.53, 54.41, 862.59, 702, 73/1.82, 1.83
See application file for complete search history.

(56) References Cited

U.S. PATENT DOCUMENTS 3,805,592 A * 4/1974 Miller et al. ............... 73/32 R
4,020,330 A * 4/1977 Bae ............................ 702/50
5,365,768 A * 11/1994 Suzuki et al. ............. 73/1.01
6,081,166 A * 6/2000 Katakura ..................... 331/57
6,397,656 B1 * 6/2002 Yamaguchi et al. ........ 73/1.82
6,450,029 B1 * 9/2002 Sakai et al. .................. 73/488
2001/0000853 A1 5/2001 Yachi et al.
2003/0006784 A1 1/2003 Ward

FOREIGN PATENT DOCUMENTS

| DE | 19811025 A1 | 9/1999 |
|---|---|---|
| EP | 1189023 A2 | 3/2002 |
| JP | 11-281372 A1 | 10/1999 |
| JP | 2003-021518 A1 | 1/2003 |

* cited by examiner

*Primary Examiner*—Robert Raevis
(74) *Attorney, Agent, or Firm*—Burr & Brown

(57) ABSTRACT

An object of the present invention is to reduce a rise time required for stabilizing the vibration state of a vibrator and the scale of a circuit needed for the activation of a driving vibration in exciting the driving vibration in the vibrator. A driving vibration is excited in a vibrator 1 for outputting a detection signal generated based on the driving vibration and a physical value, and the physical value is measured based on the detection signal. The driving vibration is excited using a circuit 9A for self-excited vibration having a CR oscillator 5A to generate an oscillation loop together with the vibrator 1. An activating signal of rectangular wave is applied on the vibrator 1 using the CR oscillator 5A to start the driving vibration in the vibrator 1.

4 Claims, 9 Drawing Sheets

Fig. 2
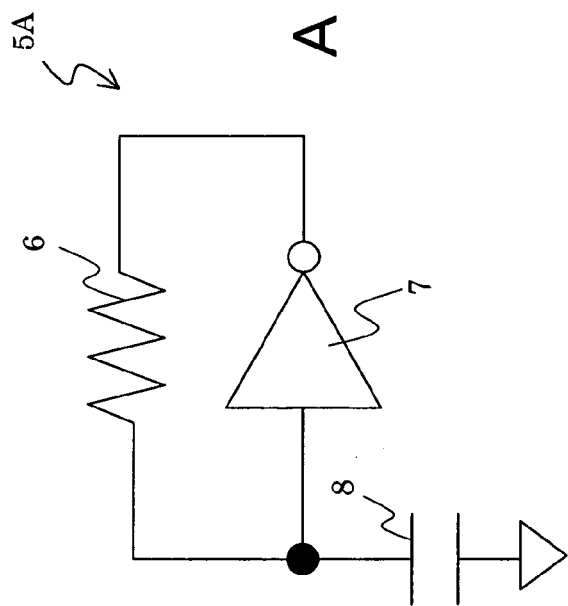
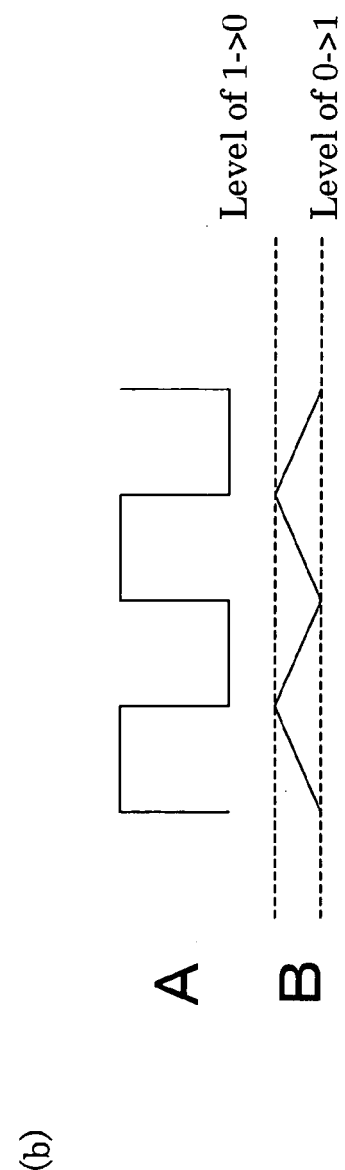
(a)
(b)

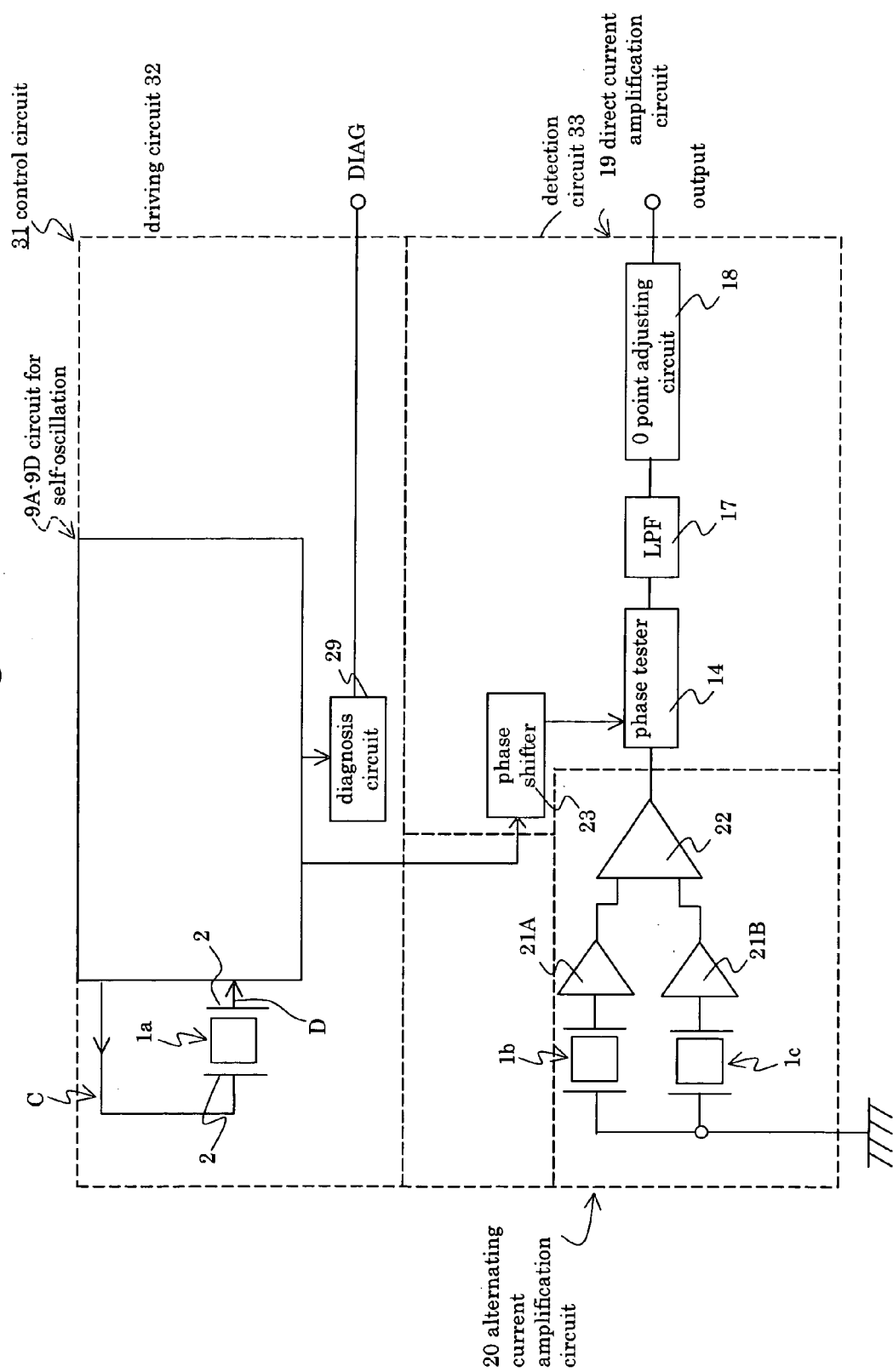

METHOD AND SYSTEM OF EXCITING A DRIVING VIBRATION IN A VIBRATOR

This application claims the benefit of Japanese Patent Application P2003-77155 filed on Mar. 20, 2003, the entirety of which is incorporated by reference.

BACKGROUND OF THE INVENTION

1. Field of the Invention

The present invention provides a method and system for exciting a driving vibration in a vibrator.

2. Related Art Statement

It has been studied to use a vibratory gyroscope as a turning angular rate sensor employed in a vehicle control system of an automobile body based on a vehicle turning rate feedback system. Such a system detects the direction of a steering wheel itself by a turning angle of the steering wheel. Simultaneously, the turning rate of the car vehicle is detected by the vibratory gyroscope. The system finds a difference by comparing the direction of the steering wheel with the actual body turning velocity, and attains a stable vehicle control by correcting a wheel torque and a steering angle on the basis of this difference.

Japanese patent publication 11-281372A mainly disclosed a vibratory gyroscope suitable for horizontal mounting using a planar vibrator. In these kinds of applications, the vibratory gyroscope is driven with a battery. It is thus necessary to reduce the consumed electric power and to lengthen the use life of the battery. It is thus desirable to inactivate the operation of the vibratory gyroscope when the vehicle stops, and to activate the gyroscope only when the vehicle starts. For this, it is indispensable to start normal operation in a short time after the vibratory gyroscope is activated and to start the detection of the position of the vehicle.

SUMMARY OF THE INVENTION

If a gyroscope is activated at the time when a vehicle is started, it takes a long time until the operation of the vibratory gyroscope is stabilized after the activation. It is impossible to confirm the direction and position of the vehicle until the operation of the gyroscope is stabilized. Such long waiting time makes the application of the gyroscope to the position control of the vehicle difficult.

The assignee filed a Japanese patent application 2001-207264A (Japanese patent publication 2003-21518A) and disclosed a method of exciting a driving vibration in a vibrator for measurement and to detect a physical value applied on the vibrator based on a detection signal obtained from the vibrator. In the publication, it is disclosed a method of activating a vibrator for measurement for reducing a rise time until the vibration of the vibrator is stabilized.

The method of activation is superior for exciting a driving vibration to activate a vibrator when the vibrator has vibration modes including a spurious vibration mode. It is, however, needed an activation circuit having an oscillator dedicated to oscillate an addition signal having a frequency substantially different from that of the spurious vibration mode and to add the signal to a circuit for self-oscillation. Such activation circuit is inevitably of a large scale. Further, if the oscillation level of the driving vibration is elevated, it becomes necessary a switching circuit for separating the addition signal oscillating from the oscillator from the circuit for self-oscillation. The scale of the activation circuit may be large, the cost tends to be high and the dimension of the circuit tends to be large. The response is not necessarily good when a driving vibration of rectangular wave is applied.

An object of the present invention is to reduce a rise time required for stabilizing the vibration state of a vibrator and to reduce the scale of a circuit needed for the activation of a driving vibration in exciting the driving vibration in the vibrator.

Another object of the present invention is to provide a method and system suitable for applying a driving signal of rectangular wave on a vibrator to excite a driving vibration in the vibrator.

A first aspect of the present invention provides a method and system of exciting a driving vibration in a vibrator for outputting a detection signal generated based on the driving vibration and a physical value and for measuring the physical value based on the detection signal. The driving vibration is excited using a circuit for self-excited vibration having a CR oscillator. An activating signal of rectangular wave is applied on the vibrator using the CR oscillator to start the driving vibration.

A second aspect of the present invention provides a method and system of exciting a driving vibration in a vibrator for outputting a detection signal generated based on the driving vibration and a physical value and for measuring the physical value based on the detection signal. The driving vibration is excited using a circuit for self-excited vibration having a ring oscillator. An activating signal of rectangular wave is applied on the vibrator oscillator to start the driving vibration.

According to the present invention of exciting a driving vibration in a vibrator for outputting a detection signal generated based on the driving vibration and a physical value and for measuring the physical value based on the detection signal, a rise time needed for stabilizing the vibration state of the vibrator can be reduced. Moreover, it is not required an oscillator dedicated to add an addition signal to a self-oscillating circuit. In addition to this, a signal from the CR oscillation circuit or ring oscillator is automatically separated from the self-oscillating circuit when the level of the driving signal is elevated, so that a switching circuit is not required. It is thus possible to reduce the scale of the circuit for self-oscillation, to lower the cost and to reduce the dimension of the circuit.

These and other objects, features and advantages of the invention will be appreciated upon reading the following description of the invention when taken in conjunction with the attached drawings, with the understanding that some modifications, variations and changes of the same could be made by the skilled person in the art.

BRIEF DESCRIPTION OF THE DRAWINGS

FIG. 2(a) is a circuit diagram showing a CR oscillation circuit 5A.

FIG. 2(b) is a diagram showing wave forms at points "A" and "B".

FIG. 9 is a block diagram showing the whole of a control circuit for a vibrator.

PREFERRED EMBODIMENTS OF THE INVENTION

Figure 1:
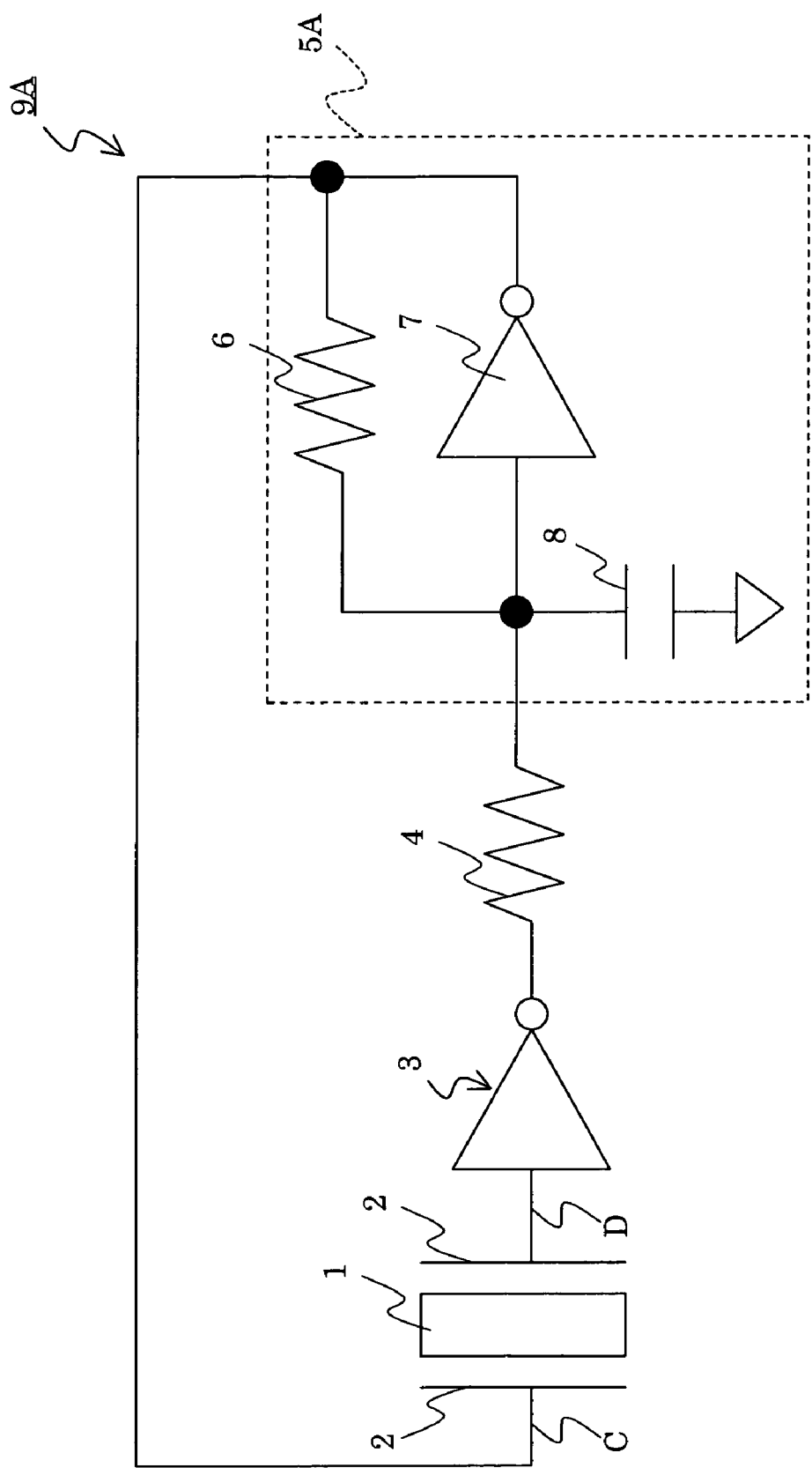
FIG. 1 is a circuit diagram showing a self-oscillating circuit 9A according to an embodiment of the first aspect of the present invention.

The present invention will be described in detail referring to the attached drawings. FIG. 1 is a diagram schematically showing a self-oscillation circuit 9A according to one embodiment of the first aspect of the present invention. A exciting means 2 is equipped with a vibrator 1 and connected with the self-oscillation circuit 9A to form an oscillation loop. The circuit is activated when a gain of a current/voltage amplifier (alternating current amplifier) 3 in the self-oscillation circuit 9A is large. Only noise is input into the amplifier 3 at the time.

The vibrator 1 is made of a piezoelectric single crystal, for example, as described later. The vibrator 1 acts as a frequency filter so that a signal substantially containing a vibration of a natural resonance frequency is output as an arrow "D". The signal "D" is input into the amplifier 3. The operations are repeated in the oscillation loop to improve the ratio of the signal having a natural resonance frequency, so that the amplitude of the input signal to the amplifier 3 is increased. The gain of the amplifier 3 is adjusted so that the loop gain (gain when the signal is circulated once in the oscillation loop) is adjusted to be 1. Finally, the loop gain reached 1 without adjusting the gain of the amplifier. At this point, the oscillation of the vibrator is stabilized.

The stable oscillation of the vibrator is indispensable for measurement of a physical value due to the following reasons. If the amplitude of the driving signal for oscillating the vibrator is not constant, the amplitude of the detection signal output by the vibrator is also not constant preventing the accurate measurement of the physical value.

According to one embodiment, the amplifier 3 is serially connected with a resistor 4 and a CR oscillation circuit 5A. The characteristics of the CR oscillation circuit 5A is described referring to FIGS. 2(a) and 2(b). The CR oscillation circuit 5A has a condenser 8, an alternating current amplifier 7 and a resistor 6. It is now provided that the rectangular wave has an input wave form as shown in "B" in FIG. 2(b) at a position "B" in the CR oscillation circuit 5A. The output wave form is sharpened as shown in "A" of FIG. 2(b) and its amplitude is increased at a position "A".

Figure 3:
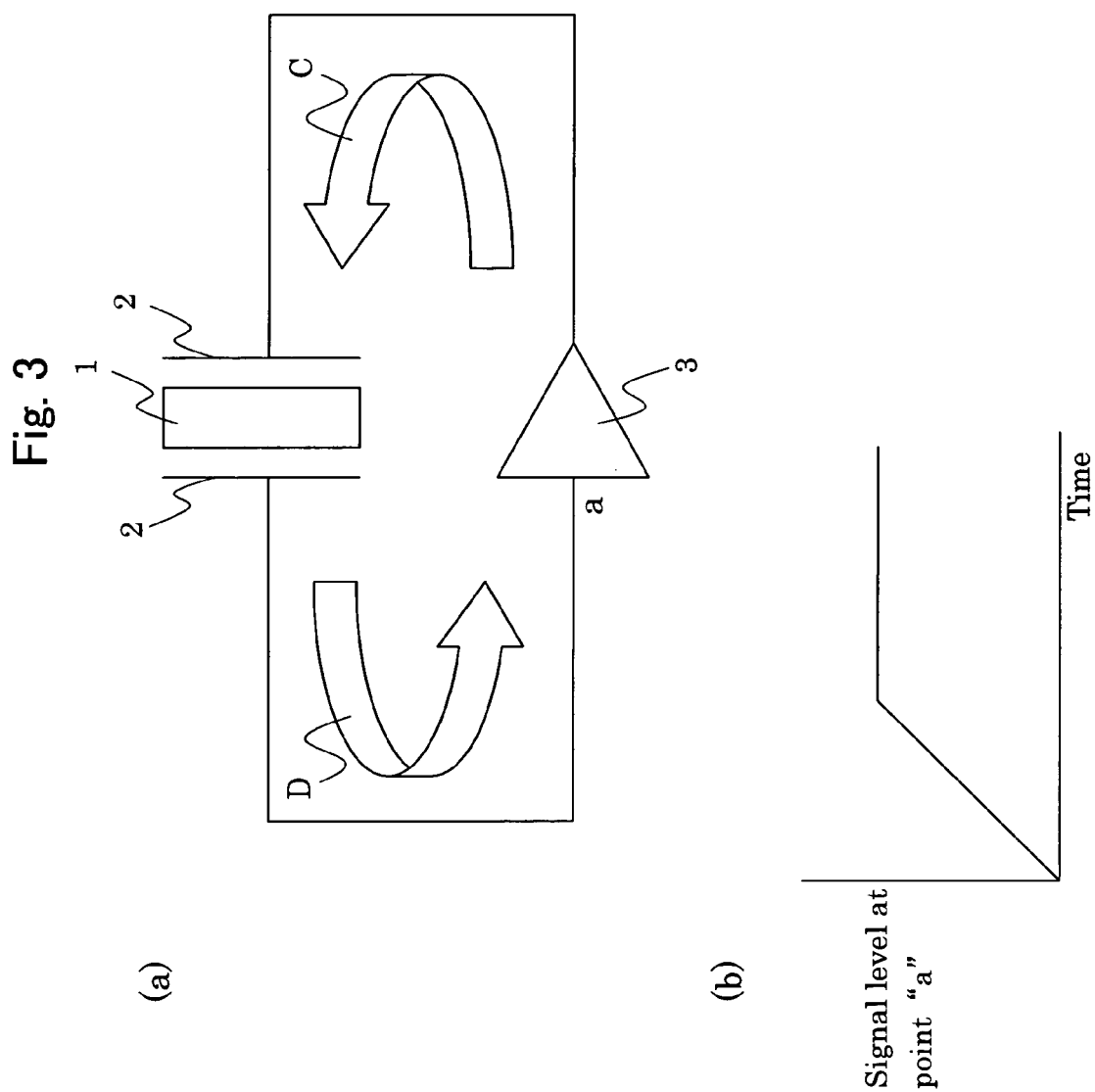
FIG. 3(a) is a diagram schematically showing an oscillation loop of a vibrator 1.
FIG. 3(b) is a diagram schematically showing the change of signal level at a point "a" over time.

Such self-oscillation circuit using a CR oscillation circuit is suitable for rapidly activating a vibrator due to the following reasons. As shown in FIG. 3(a), it is provided that the vibrator 1 is excited using the self-oscillation circuit. When the signal wave has a wave form of a sine wave, the signal level at the point "a" is gradually increased over time as described above and then stabilized (loop gain reaches 1). When a sine wave is input, the amplifier 3 exhibits linear amplification characteristic.

Figure 4:
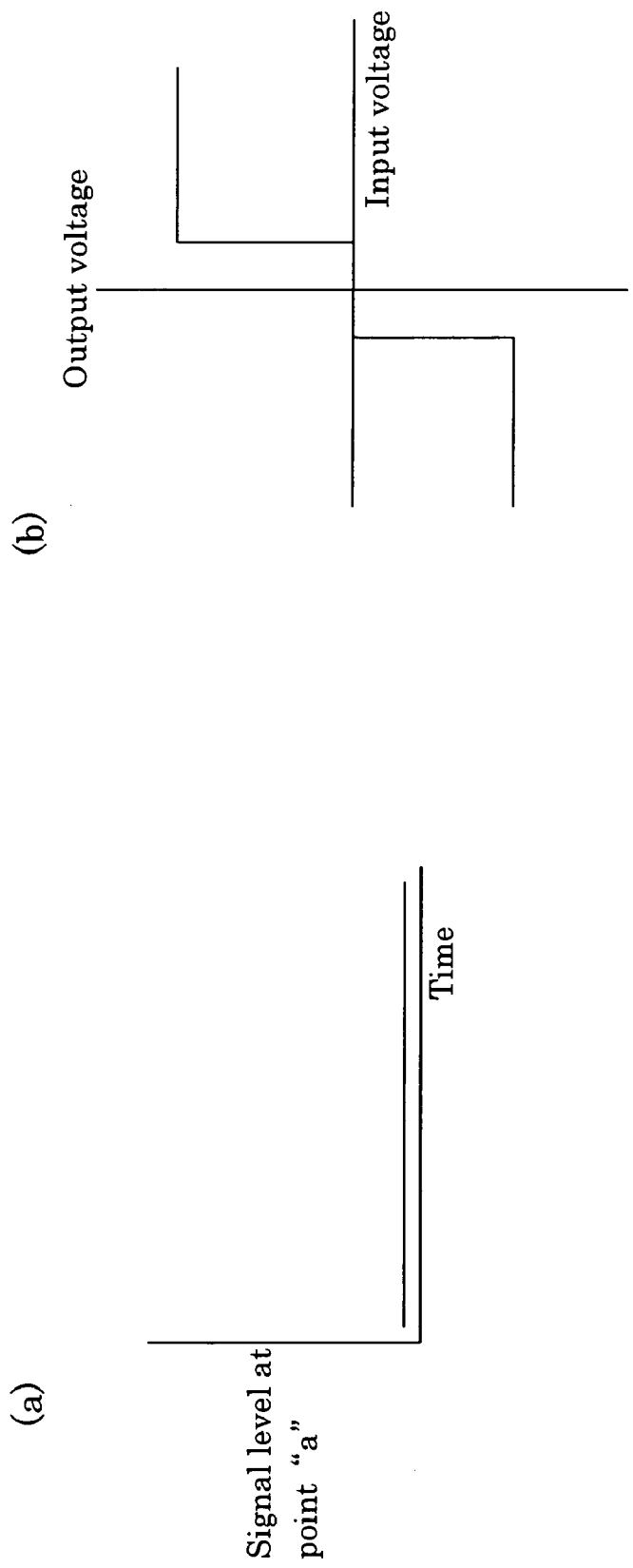
FIG. 4(a) is a diagram schematically showing the change of signal level at a point "a" over time when a rectangular wave is used.
FIG. 4(b) is a diagram schematically showing the characteristic of amplification of an alternating current amplifier.

On the contrary, when rectangular wave is input as the signal wave for the driving vibration, the signal level at the point "a" may not be substantially increased over time due to the following reasons as shown in FIG. 4. When rectangular wave is input to the amplifier, the amplification characteristic of the amplifier has a lower threshold (lower limit) as shown in FIG. 4(b). The signal level cannot be amplified in a short time if the initial level of the signal wave is low.

In the examples shown in FIGS. 1 and 2, it is possible to sharpen the wave form of the rectangular wave and to improve the amplitude in the CR oscillation circuit 5A as shown in FIG. 2(b). The signal wave can be easily amplified during the rectangular wave for the driving signal is looped as arrows "C" and "D", by providing the CR oscillation circuit in the self-oscillation circuit 9A, even when the initial level of the signal wave is low. The driving vibration of the vibrator can be activated in a short time by utilizing the characteristics of the CR oscillation circuit.

As the level of the driving signal of a target frequency is large, the CR oscillation circuit is automatically separated from the oscillation from the self-oscillation circuit without switching.

As described above, the present invention is superior in that the driving signal of rectangular wave can be applied on the vibrator in a short time period without the need of the dedicated oscillator and switching mechanism.

Figure 5:
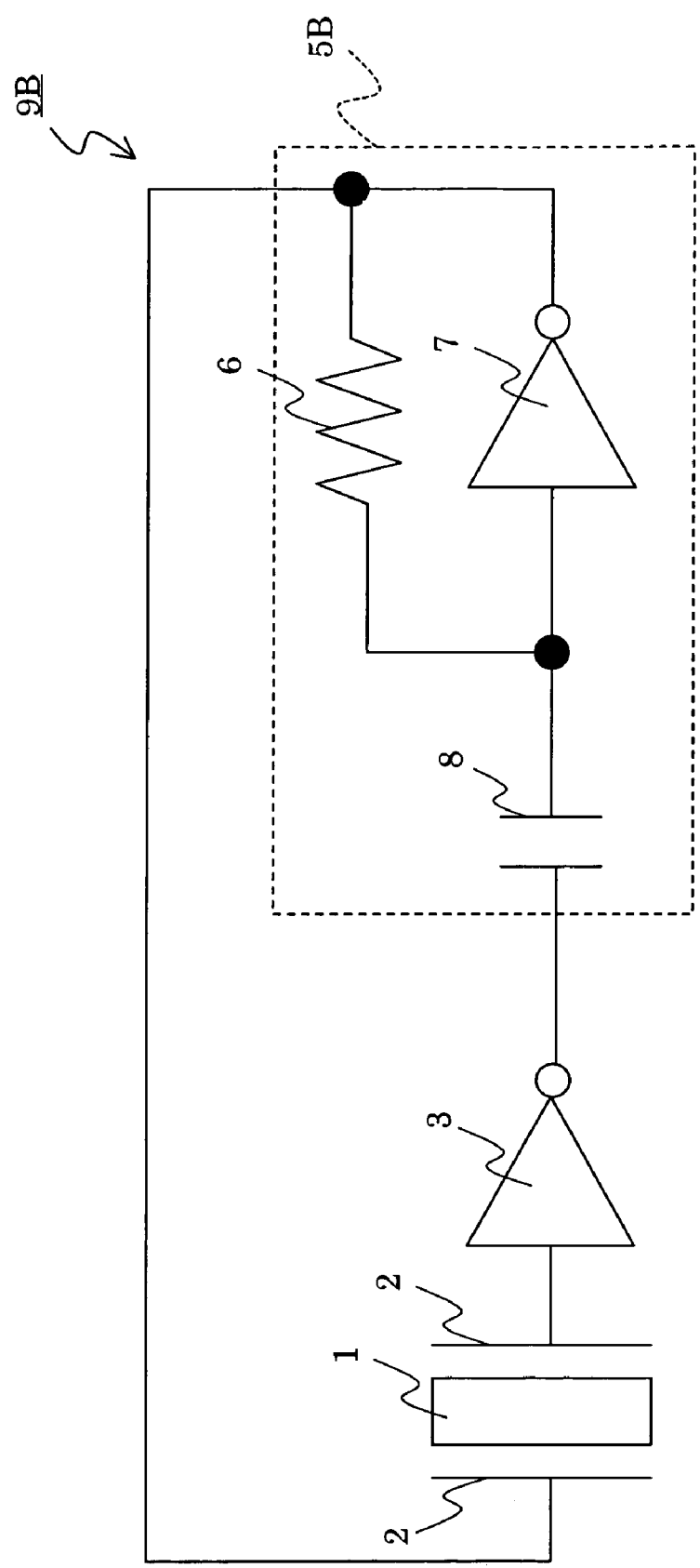
FIG. 5 is a circuit diagram showing a self-oscillating circuit 9B according to another embodiment of the first aspect of the present invention.

FIG. 5 is a circuit diagram showing a self-oscillating circuit 9B according to the first aspect of the present invention. A CR oscillation circuit 5B used in the present example also has a condenser 8, an amplifier 7 and a resistor 6. The amplifier 7 and condenser 8 are serially connected in the present example.

Figure 6:
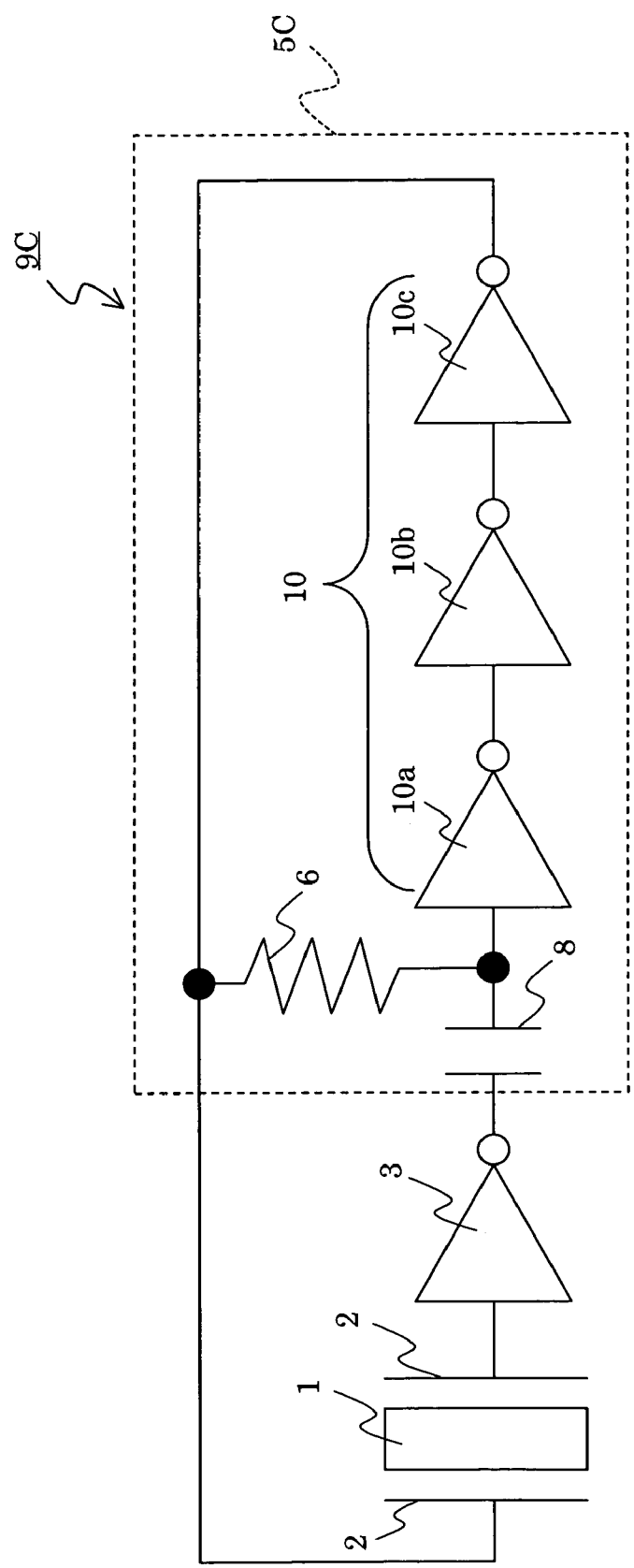
FIG. 6 is a circuit diagram showing a self-oscillating circuit 9C according to an embodiment of the second aspect of the present invention.

FIG. 6 is a circuit diagram showing a self oscillating circuit 9C according to an embodiment of the second aspect of the present invention. In the present embodiment, a ring oscillator 10 is connected instead of the above CR oscillation circuit. That is, a plurality of amplifiers 10a, 10b and 10c are serially connected with each other to produce the ring oscillator 10. The ring oscillator 10 is serially connected with the condenser 8 and connected with the resistor 6 in parallel.

Figure 7:
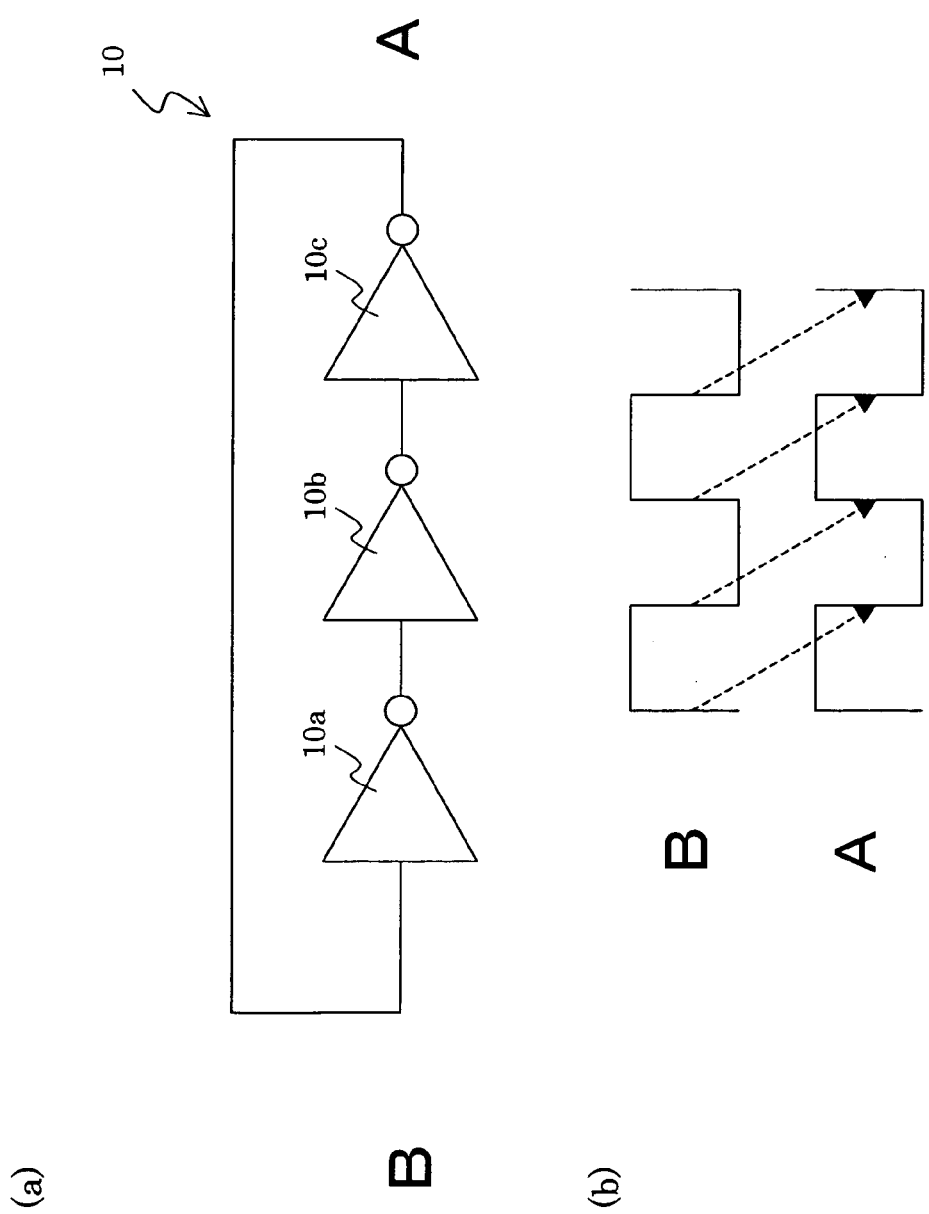
FIG. 7(a) is a circuit diagram showing a ring oscillator 10.
FIG. 7(b) is a diagram schematically showing modulation of rectangular wave at points "A" and "B".

The characteristics of the ring oscillator 10 is schematically shown in FIGS. 7(a) and (b). Rectangular wave at the point "B" in the upstream of the ring oscillator 10 is output at the point "A" as rectangular wave with the phase delayed as arrows. The phase of the rectangular wave is made delayed at a predetermined time period in the ring oscillator 10, and the ring oscillator 10 is connected with the self-oscillator 10. It is thus possible to amplify the signal of a specific frequency in the ring oscillator 10.

Figure 8:
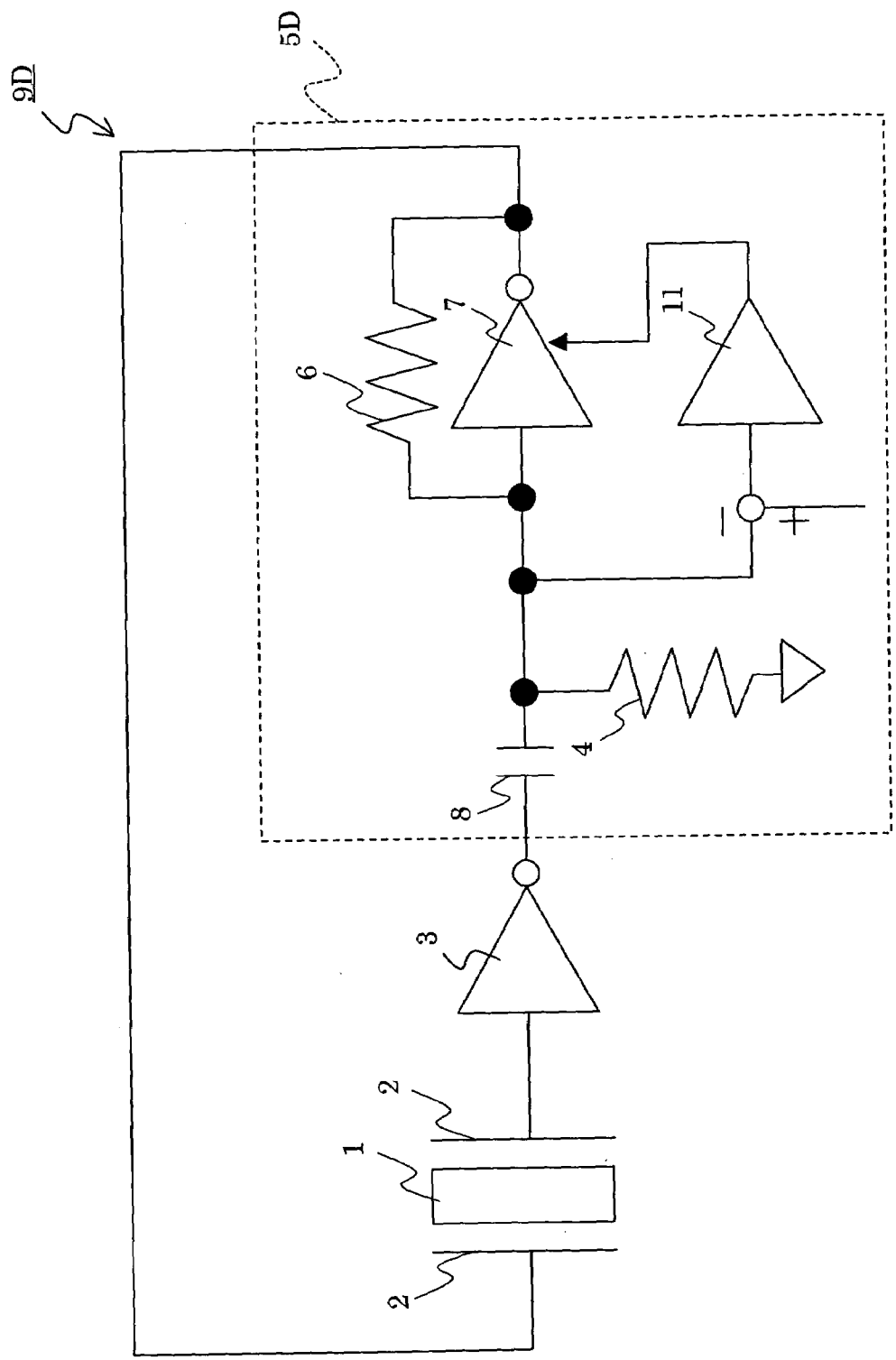
FIG. 8 is a diagram showing a self-oscillating circuit 9D according to still another embodiment of the present invention.

FIG. 8 is a circuit diagram showing another self-oscillation circuit 9D according to an embodiment of the first aspect of the present invention. The circuit of the present example is substantially same as the self-oscillating circuit 9B of FIG. 5, except that the circuit is ground through a resistor 4 in the present example. Further, an accumulator 11 is connected with an accumulator 7 to provide a comparator. A standard voltage line is connected to the accumulator 11. The amplitude of the signal in the circuit is judged by the accumulator 11, and, responsive to this, the gain in the amplifier 7 is controlled.

In a preferred embodiment, the self-oscillation circuit has an alternating current amplifier for frequency control and a circuit for controlling amplitude (AGC circuit). In the circuit for controlling amplitude, the deviation of the amplitude is prevented to output a signal having a constant value of amplitude.

FIG. 9 is a block diagram schematically showing a control circuit of a vibrator usable in the present invention. The control circuit 31 has a driving circuit 32 and a detection circuit 33. The driving circuit 32 is provided for exciting a driving vibration part 1a of a vibrator 1. The driving circuit 32 has self-oscillation circuits 9A, 9B, 9C or 9D and a diagnosis circuit 29.

When the vibrator is activated, a noise is input from an activation circuit to the self-oscillation circuit. The noise passes through the driving vibration part 1a of the vibrator and subject to frequency selection, and then input into the alternating current amplifier 3 of the self-oscillation circuit for subsequent amplification as an arrow "D". A part of the output signal from the alternating current amplifier 3 is drawn and input to a rectifier to convert the signal to the amplitude value of the signal. The signal of amplitude value is input to the CR oscillation circuit or ring oscillator. The self-oscillation circuit is connected to the diagnosis circuit 29, and the output of the diagnosis circuit 29 is output through a DIAG terminal to the outside.

A substantial portion of the noise is cut in the vibrator 1a direct after the activation, so that the output from the rectifier is relatively low. The gain in the amplifier is made large so that a loop gain during one oscillation loop is adjusted at 1. Since the output from the rectifier becomes larger over time, the gain in the amplifier is made lower so that the loop gain is adjusted at 1.

After the vibration state of the driving signal is stabilized, the detection of signals by detection parts 1b and 1c of the vibrator is started. That is, detection signals (alternating current) from the detection parts 1b and 1c of the vibrator are amplified using alternating current amplifiers 21A and 21B. Outputs from the amplifiers 21A and 21B are added by an adder 22.

Further, a part of a driving signal is derivated and the thus derivated signal is supplied to a phase shifter 23 to obtain to a sifted signal. The phase of the shifted signal is different from that of a leakage signal at a predetermined angle, for example, 90°. The shifted signal is input into a phase detector 14 to detect the output signal from the vibrator. As a result, unnecessary leakage signal should be cancelled or at least reduced in the output signal after the phase detection. The output signal after the phase detection is input into a low path filter 17 and smoothed and then input into a zero point adjusting circuit 18. The output is drawn to the outside.

The construction of the vibrator is not particularly limited. The Q value of a material for the vibrator may preferably be 3000 or higher, and more preferably be 10000 or higher. The material for the vibrator includes a permanent elastic alloy such as elinver and a ferroelectric single crystal (piezoelectric single crystal). Such single crystal includes quartz, lithium niobate, lithium tantalate, lithium niobate-lithium tantalate solid solution, lithium borate and langasite.

A physical value measured according to the present invention is not particularly limited. When a driving vibration is excited in a vibrator and the vibration state of the vibrator is changed due to the effects of a specific physical quantity exerted on the vibrator, the physical value is included in the present invention as far as the physical value can be detected through a detection circuit. Such physical value may preferably be an acceleration, an angular acceleration or an angular velocity applied on a vibrator. The measuring system of the present invention may preferably be an inertia censor.

EXAMPLES

An experiment for exciting a driving vibration is performed applying a circuit described above referring to FIGS. 8 and 9. A vibrator described in Japanese patent publication 11-281372A was used. The vibrator had two driving vibration pieces 1a, and two detection vibration pieces 1b and 1c vibrating independently from the driving vibration pieces. Noise in a frequency range of 100 to 500 kHz was generated from the activation circuit, and then input into the oscillation loop to activate self-oscillation. The delay time of the comparator was 1.0 μs (500 kHz), the amplitude of output was 2Vp-p, and the width of dead zone voltage was 5 mV. The resistance of the resistor 6 was 10 MΩ, and the capacity of the condenser 8 was 10 pF (1 MHz). A time period required for stabilizing the oscillation of the driving signal was about 0.160 seconds. The amplitude of the driving signal was 1.1 V and the frequency was 44.1 kHz.

As described above, according to the present invention, a rise time required for stabilizing the vibration state of a vibrator and the scale of a circuit needed for the activation of a driving vibration can be reduced in exciting the driving vibration in the vibrator. Further, the present invention provides a method and system suitable for applying a driving signal of rectangular wave on a vibrator to excite a driving vibration in the vibrator.

The present invention has been explained referring to the preferred embodiments, however, the present invention is not limited to the illustrated embodiments which are given by way of examples only, and may be carried out in various modes without departing from the scope of the invention.

The invention claimed is:

1. A method of exciting a driving vibration in a vibrator for outputting a detection signal generated based on said driving vibration and a physical value and for measuring said physical value based on said detection signal, wherein said driving vibration is excited using a closed-loop circuit comprising a CR oscillator having an input and an output, said method comprising the steps of:
   applying an activating signal of rectangular wave from said output of said CR oscillator to said vibrator to start said driving vibration; and
   passing the signal from said vibrator to said input of said CR oscillator.

2. A system for exciting a driving vibration in a vibrator for outputting a detection signal generated based on said driving vibration and a physical value and for measuring said physical value based on said detection signal,
   said system comprising a closed-loop circuit for exciting said driving vibration, said circuit comprising a CR oscillator having an input and an output for applying an activating signal of rectangular wave from said output of said CR oscillator to said vibrator to start said driving vibration and for receiving the signal from said vibrator into said input of said CR oscillator.

3. A method of exciting a driving vibration in a vibrator for outputting a detection signal generated based on said driving vibration and a physical value and for measuring said physical value based on said detection signal, wherein said driving vibration is excited using a closed-loop circuit comprising a ring oscillator having an input and an output, said method comprising the steps of:
   applying an activating signal of rectangular wave from said output of said ring oscillator to said vibrator to start said driving vibrations; and
   passing the signal from said vibrator to said input of said ring oscillator.

4. A system for exciting a driving vibration in a vibrator for outputting a detection signal generated based on said driving vibration and a physical value and for measuring said physical value based on said detection signal, said system comprising a closed-loop circuit for exciting said driving vibration, said circuit comprising a ring oscillator having an input and an output for applying an activating signal of rectangular wave from said output of said ring oscillator to said vibrator to start said driving vibration and for receiving the signal from said vibrator into said input of said ring oscillator.

* * * * *